US010242257B2

(12) United States Patent
Hosabettu et al.

(10) Patent No.: US 10,242,257 B2
(45) Date of Patent: Mar. 26, 2019

(54) METHODS AND DEVICES FOR EXTRACTING TEXT FROM DOCUMENTS

(71) Applicant: Wipro Limited, Bangalore (IN)

(72) Inventors: Raghavendra Hosabettu, Bangalore (IN); Sendil Kumar Jaya Kumar, Bangalore (IN); Raghottam Mannopantar, Bangalore (IN)

(73) Assignee: Wipro Limited, Bangalore (IN)

(*) Notice: Subject to any disclaimer, the term of this patent is extended or adjusted under 35 U.S.C. 154(b) by 20 days.

(21) Appl. No.: 15/639,399

(22) Filed: Jun. 30, 2017

(65) Prior Publication Data
US 2018/0336404 A1 Nov. 22, 2018

(30) Foreign Application Priority Data

May 18, 2017 (IN) .............................. 201741017499

(51) Int. Cl.
*G06K 9/00* (2006.01)
*G06K 9/32* (2006.01)

(52) U.S. Cl.
CPC ..... *G06K 9/00449* (2013.01); *G06K 9/00463* (2013.01); *G06K 9/325* (2013.01)

(58) Field of Classification Search
CPC . G06K 9/00449; G06K 9/00463; G06K 9/325
See application file for complete search history.

(56) References Cited

U.S. PATENT DOCUMENTS

| 5,956,422 | A | 9/1999 | Alam |
| 6,006,240 | A | 12/1999 | Handley |
| 6,173,073 | B1* | 1/2001 | Wang ................. G06K 9/00449 382/171 |
| 9,495,347 | B2 | 11/2016 | Stadermann et al. |
| 2006/0288268 | A1 | 12/2006 | Srinivasan et al. |
| 2008/0168036 | A1 | 7/2008 | Young et al. |
| 2014/0369602 | A1* | 12/2014 | Meier ................ G06K 9/00463 382/182 |

(Continued)

OTHER PUBLICATIONS

Klampfl, et al., "A Comparison of Two Unsupervised Table Recognition Methods From Digital Scientific Articles", D-Lib Magazine, Nov. 2014, 1-15 pgs, vol. 20, No. 11/12, Retrieved from the Internet:<URL:http://www.dlib.org/dlib/november14/ klampfl/11klampfl.html>.

(Continued)

*Primary Examiner* — David F Dunphy
(74) *Attorney, Agent, or Firm* — LeClairRyan PLLC

(57) ABSTRACT

Methods, devices, and non-transitory computer readable storage media for extracting text from documents are disclosed. The method includes performing layout analysis on the document to identify a plurality of regions within a plurality of pages in the document. The method further includes identifying a table region from within the plurality of regions based on homogeneity between a plurality of textual lines in a page from the plurality of pages. The method includes identifying at least two rows and at least two columns within the table region. The method further includes identifying a plurality of cells within the table region based on the at least two rows and the at least two columns. The method includes extracting text from each of the plurality of cells.

15 Claims, 11 Drawing Sheets

(56) References Cited

U.S. PATENT DOCUMENTS

2016/0055376 A1    2/2016  Koduru
2016/0140145 A1    5/2016  Bruno et al.

OTHER PUBLICATIONS

Yildiz, et al., "pdf2table: A Method to Extract Table Information From PDF Files", Jan. 2005, 13pgs, Retrieved from the Internet:<URL: http://ieg.ifs.tuwien.ac.at/projects/pdf2table/yildiz_iicai05.pdf>.

\* cited by examiner

METHODS AND DEVICES FOR EXTRACTING TEXT FROM DOCUMENTS

This application claims the benefit of Indian Patent Application Serial No. 201741017499, filed May 18, 2017, which is hereby incorporated by reference in its entirety.

FIELD

This disclosure relates generally to text extraction and more particularly to methods and devices for extracting text from documents.

BACKGROUND

In documents, such as, financial reports, product documents, and scientific articles, for better interpretation of data, data is usually presented in the form of a table that includes multiple rows and columns. These table structures allow the owner of a document to present information in a structured manner and to summarize key results and main facts. Tables are also used by analysts for data mining, information retrieval, trend analysis and other such tasks.

As the data included in such tables is central to understanding the document, it is necessary in machine learning to read and understand table data, in order to use the document for further analysis. However, owing to large variability of table layouts, table styles, information type and format, and lack of availability of document encoding/formats information, it's a significant challenge to accurately identify and retrieve information from a table. Some examples of variability in tables may include, different heights of rows and columns, merging of cells, different number of column, different number of rows in different columns, or different types of borders distinguishing the cells.

SUMMARY

In one embodiment, a method for extracting text from a document is disclosed. The method includes performing, by a text extraction device, layout analysis on the document to identify a plurality of regions within a plurality of pages in the document; identifying, by the text extraction device, a table region from within the plurality of regions based on homogeneity between a plurality of textual lines in a page from the plurality of pages, wherein the homogeneity is computed based on a plurality of preselected textual parameters associated with the plurality of textual lines; identifying, by the text extraction device, at least two rows and at least two columns within the table region; identifying, by the text extraction device, a plurality of cells within the table region based on the at least two rows and the at least two columns; and extracting, by the text extraction device, text from each of the plurality of cells.

In another embodiment, a text extraction device for extracting text from a document is disclosed. The text extraction device includes a processor; and a memory communicatively coupled to the processor, wherein the memory stores processor instructions, which, on execution, causes the processor to perform layout analysis on the document to identify a plurality of regions within a plurality of pages in the document; identify a table region from within the plurality of regions based on homogeneity between a plurality of textual lines in a page from the plurality of pages, wherein the homogeneity is computed based on a plurality of preselected textual parameters associated with the plurality of textual lines; identify at least two rows and at least two columns within the table region; identify a plurality of cells within the table region based on the at least two rows and the at least two columns; and extract text from each of the plurality of cells.

In yet another embodiment, a non-transitory computer-readable storage medium is disclosed. The non-transitory computer-readable storage medium has instructions stored thereon, a set of computer-executable instructions causing a computer comprising one or more processors to perform steps comprising performing, by a text extraction device, layout analysis on the document to identify a plurality of regions within a plurality of pages in the document; identifying, by the text extraction device, a table region from within the plurality of regions based on homogeneity between a plurality of textual lines in a page from the plurality of pages, wherein the homogeneity is computed based on a plurality of preselected textual parameters associated with the plurality of textual lines; identifying, by the text extraction device, at least two rows and at least two columns within the table region; identifying, by the text extraction device, a plurality of cells within the table region based on the at least two rows and the at least two columns; and extracting, by the text extraction device, text from each of the plurality of cells.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
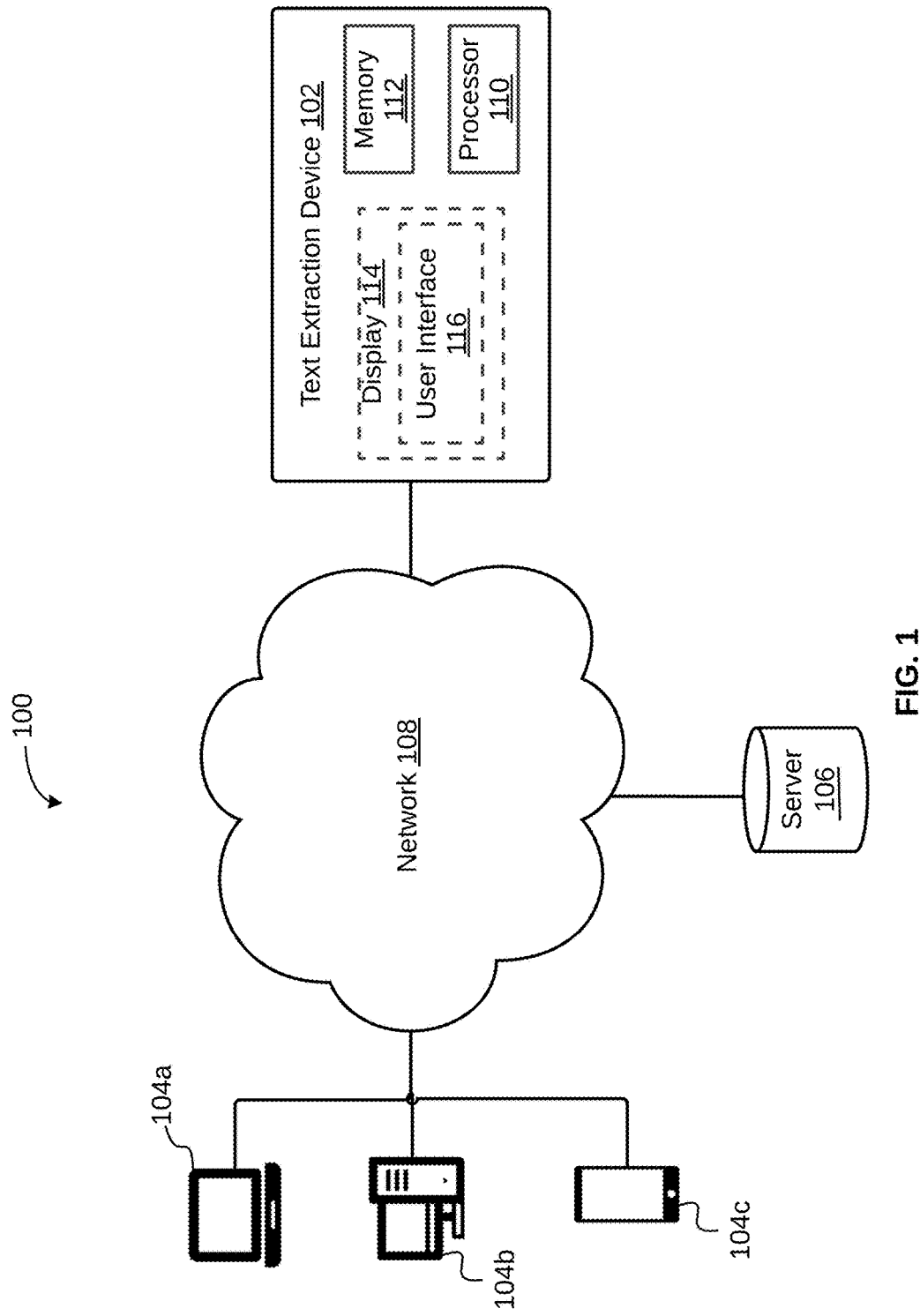
FIG. 1 is a block diagram illustrating a system for text extraction from a document, in accordance with an embodiment.

Additional illustrative embodiments are listed below. In one embodiment, a system 100 for extracting text from documents is illustrated in FIG. 1. Examples of these documents may include, but are not limited to PDF documents, images, or web-pages. These documents may have copy restrictions, which may lead to inaccuracy in text extracted from the documents. System 100 includes a text extraction device 102 that accurately extracts text from these documents. In particular, text extraction device 102 identifies table regions within a document and subsequently extracts text from these table regions. In order to derive accurate information from a table region, the text within the table has to be extracted in the right and intended context, irrespective of the document having copy restrictions or not.

The documents may be accessed by a plurality of computing devices 104 (for example, a laptop 104a, a desktop 104b, and a smart phone 104c). The documents may be stored within plurality of computing devices 104. Other examples of plurality of computing devices 104, may include, but are not limited to a phablet and a tablet. Alternatively, the documents may be stored on a server 106 and may be accessed by plurality of computing devices 104 via a network 108. Network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

When a user of laptop 104a, for example, wants to extract text from a document accessed by the user, laptop 104a communicates with text extraction device 102, via network 108. Text extraction device 102 then extracts text as per the user's request. To this end, text extraction device 102 includes a processor 110 that is communicatively coupled to a memory 112, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 110 further includes various modules that enable text extraction device 102 to extract text from a document as requested by the user. These modules are explained in detail in conjunction with FIG. 2. Text extraction device 102 may further include a display 114 having a User Interface (UI) 116 that may be used by a user or an administrator to upload documents and provide various inputs to text extraction device 102. Display 114 may further be used to display result of the text extraction from a document. The functionality of text extraction device 102 may alternatively be configured within each of plurality of computing devices 104.

Figure 2:
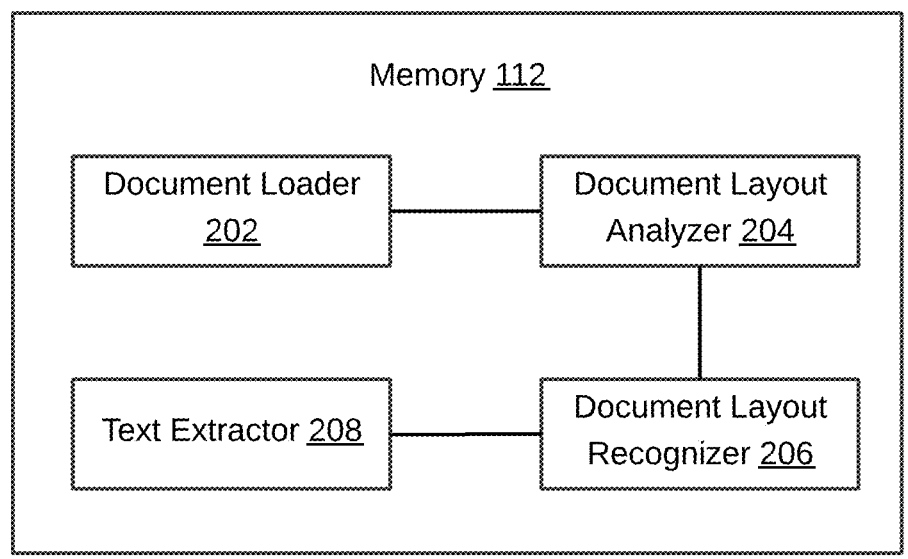
FIG. 2 is a block diagram illustrating various modules within a memory of a text extraction device configured to extract text from a document, in accordance with an embodiment.

Referring now to FIG. 2, a block diagram of various modules within memory 112 of text extraction device 102 configured to extract text from a document is illustrated, in accordance with an embodiment. Memory 112 includes a document loader 202, a document layout analyzer 204, a document layout recognizer 206, and a text extractor 208.

Document loader 202 may load a document in various formats for further processing by text extraction device 102. A document, for example, may be an image format (for example, jpg, png, or tiff etc) or a text image embedded in a pdf document. Once the document has been loaded, document layout analyzer 204 performs layout analysis on the document to identify a plurality of regions within a plurality of pages in the document. The plurality of regions may include, but are not limited to a table, a header, a footer, page columns, and images. This is further explained in detail in conjunction with FIG. 3.

Document layout recognizer 206 then identifies a table region from within the plurality of regions based on homogeneity between a plurality of textual lines in a page from the plurality of pages. The homogeneity is computed based on a plurality of preselected textual parameters associated with the plurality of textual lines. This is further explained in detail in conjunction with FIG. 3, FIG. 6, and FIG. 8. Thereafter, document layout recognizer 206 identifies two or more rows and two or more columns within the table region. Based on the two or more rows and the two or more columns, text extractor 208 identifies a plurality of cells within the table region. Text extractor 208 then extracts text from each of the plurality of cells. This is further explained in detail in conjunction with FIG. 3.

Figure 3:
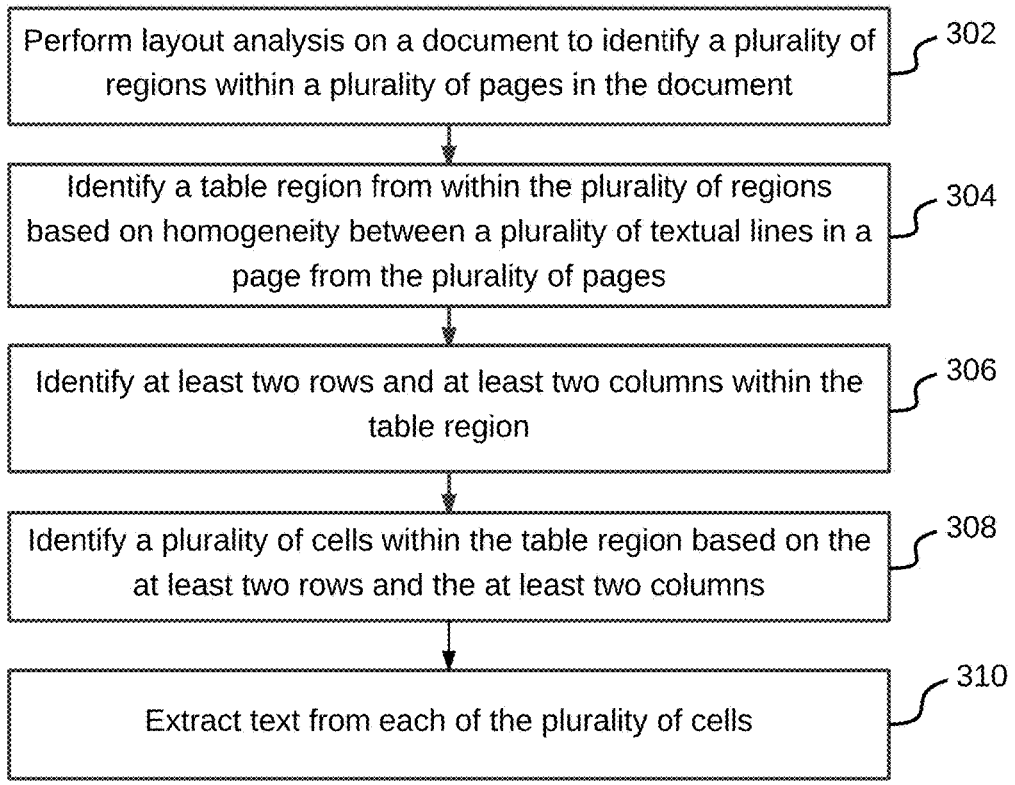
FIG. 3 illustrates a flowchart of a method of text extraction from a document, in accordance with an embodiment.

Referring to FIG. 3, a flowchart of a method for text extraction from a document, in accordance with an embodiment. The document may be in an image format, for example, jpg, png, or tiff. Alternatively, the document may be a text image embedded in pdf. The document may include a plurality of pages. Each of the plurality of pages may further include content that is either copy restricted or cannot be copied accurately or in the right context. The document may be provided by a user to text extraction device 102 in order to extract desired text from the document. In an embodiment, the user may upload the document to text extraction device 102 via UI 116.

At step 302, text extraction device 102 performs layout analysis on the document to identify a plurality of regions within the plurality of pages in the document. The plurality of regions may include headers, footers, one or more page columns, one or more tables, or one or more images. After the plurality of regions have been identified, coordinates of each of these regions are also stored by text extraction device 102 for further analysis. By way of an example, after a header region has been identified, its X and Y coordinates within a page along with the number of that page within the document are stored. Additional information related to the header region, for example, the header region being located in the top left and the bottom right of the page, may also be stored by text extraction device 102. In a similar manner, all other regions are identified and their coordinates are stored. Once the plurality of regions are identified, one or more regions from the plurality of regions that are not a table or a page column are discarded. In other words, these regions are not considered for any future analysis.

At step 304, text extraction device 102 identifies a table region from within the plurality of regions based on homogeneity between a plurality of textual lines in a page from the plurality of pages. The homogeneity is computed based on a plurality of preselected textual parameters associated with the plurality of textual lines. The plurality of preselected textual parameters may include, but are not limited to number of words, number of characters, font type, font style, font height, or line spacing. Homogeneity between two or more textual lines indicates that these textual lines are part of a table region. By way of an example, if font type, font style, and font height for two contiguous textual lines in a page are same, then the two contiguous textual lines are considered homogeneous and thus may indicate existence of a table region. The homogeneity between textual lines may be determined based on the methods described in FIG. 6 and FIG. 8.

As page columns would include the one or more tables, thus, in order to identify a table region, the one or more page columns within each of the plurality of pages in the document are first identified. Thereafter, for each of the one or more page columns the step 304 is recursively performed. The one or more page columns may be identified based on a threshold number of characters and a threshold number of words associated with a page column width. Additionally, width of the page being analyzed is also considered to identify the one or more page columns. When a page includes multiple page columns, a page column space threshold may also be used to identify each of these multiple page columns. The page column space threshold may be the width of an empty space that separates two adjacent page columns in a page. After the identification, the text extraction device 102 store the number of page columns within a page, width of each page column, and coordinates of each page column in that page. When a page column does not run the whole width of the page, then text extraction device 102 also stores boundary of that page column. The boundary of a page column, for example, may be stored as top left corner and bottom right corners of the page column.

Figure 4:
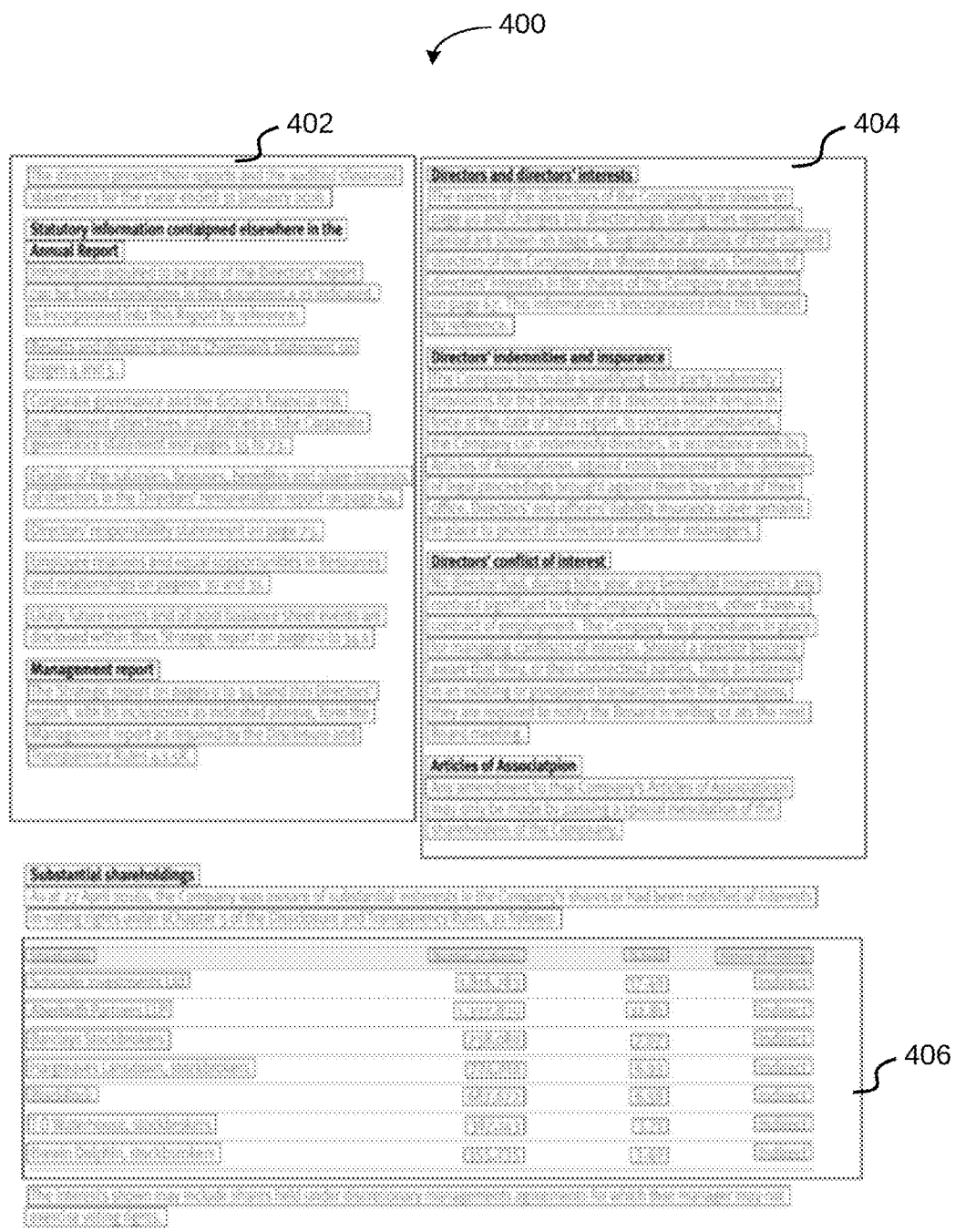
FIG. 4 illustrates identification of multiple page columns within a page of a document, in accordance with an exemplary embodiment.

In an embodiment, standard Application Programming Interface (API) from tools such as FREEOCR, TESSRACT, or ONENOTE, may be used for identifying page columns recognition within a page. As depicted in the exemplary embodiment of FIG. 4, three page columns, i.e., a page column 402, a page column 404, and a page column 406 are identified within a page 400.

Once the table region is identified, text extraction device 102 identifies two or more rows and two or more columns within the table region at step 306. In order to identify rows and columns within the table region, a plurality of sets of contiguous pixels that have a predefined color are identified within the table region. By way of an example, the predefined color may be white. In this case, white contiguous pixels, above a minimum number of pixel width, are identified in both vertical and horizontal direction of the document in order to identify rows and columns within the table region. Once the two or more rows and columns have been identified, their coordinates or boundary within a page along with the page number are also stored for further analysis. When text extraction device 102 fails to identify at least two rows and at least two columns, the table region is discarded. Subsequently, another table region may be identified.

Based on the coordinates or boundary stored for the rows and columns within the table region, text extraction device 102, at step 308, identifies a plurality of cells within the table region. For each of the plurality of cells, text extraction device 102 identifies and stores coordinates of the top left corner (for example, X1 and Y1) and coordinates for the bottom right corner (for example, X2 and Y2). This step is repeated for the whole table region, in order to identify each and every cell in the table region. Text extraction device 102 then extracts, at step 310, text from each of the plurality of cells and saves it in a predefined format as requested by the user. Examples of the predefined format may include, but are not limited to CSV, XML or Jason.

Figure 5:
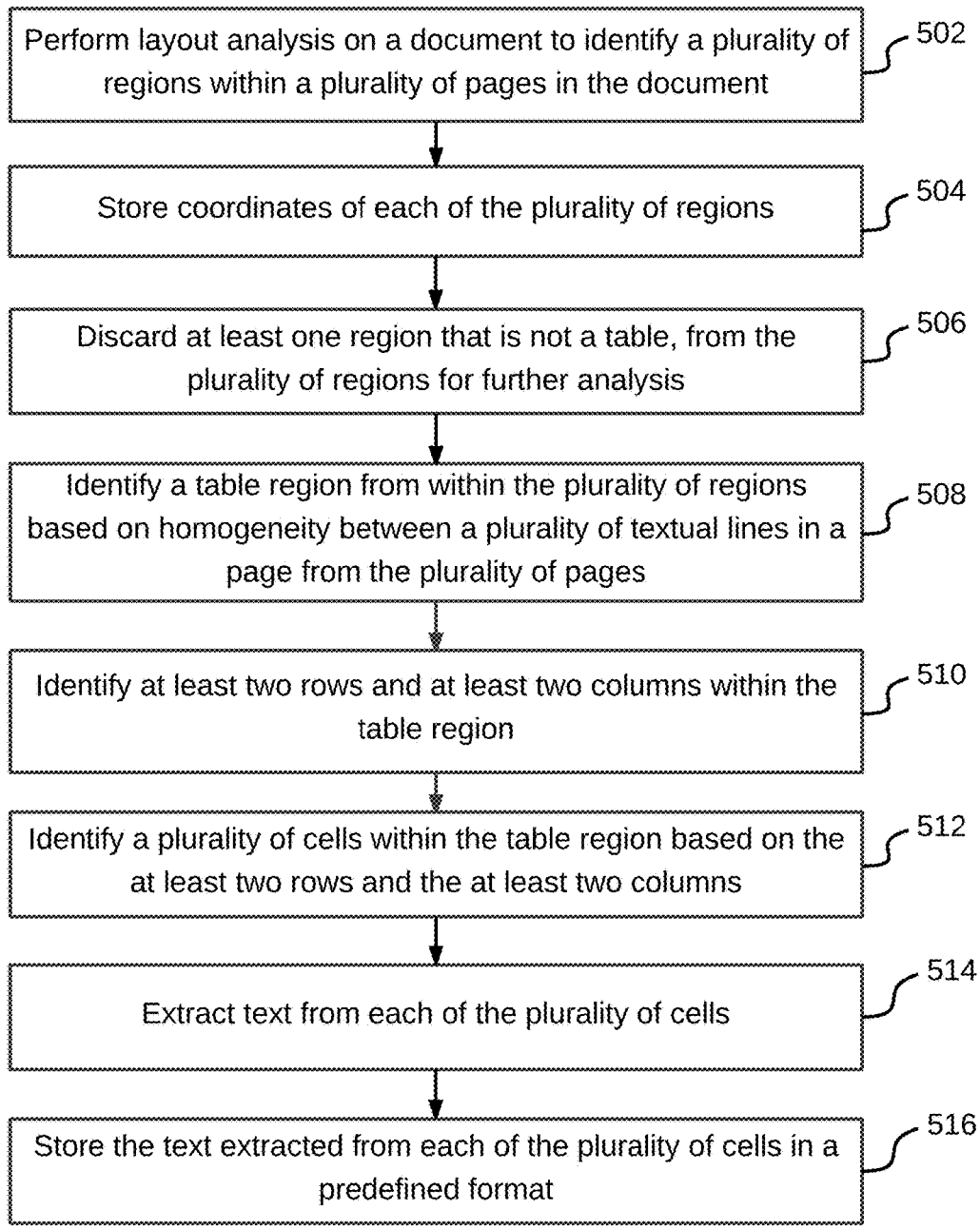
FIG. 5 illustrates a flowchart of a method of text extraction from a document, in accordance with another embodiment.

Referring now to FIG. 5, a flowchart of a method for text extraction from a document is illustrated, in accordance with another embodiment. At step 502, layout analysis is performed on a document to identify a plurality of regions within a plurality of pages in the document. At step 504, coordinates of each of the plurality of regions is stored. At step 506, one or more regions that are not a table are discarded from the plurality of regions for further analysis. At step 508, a table region is identified from within the plurality of regions based on homogeneity between a plurality of textual lines in a page from the plurality of pages. This has been explained in detail in conjunction with FIG. 3.

Based on coordinates or boundary of the table region, two or more rows and two or more columns are identified within the table region at step 510. This has been explained in detail in conjunction with FIG. 3. Thereafter, based on the two or more rows and two or more columns, a plurality of cells are identified within the table region at step 512. Text is extracted from each of the plurality of cells at step 514. The text extracted from each of the plurality of cells is then stored in a predefined format at step 516. This has been explained in detail in conjunction with FIG. 3.

Figure 6:
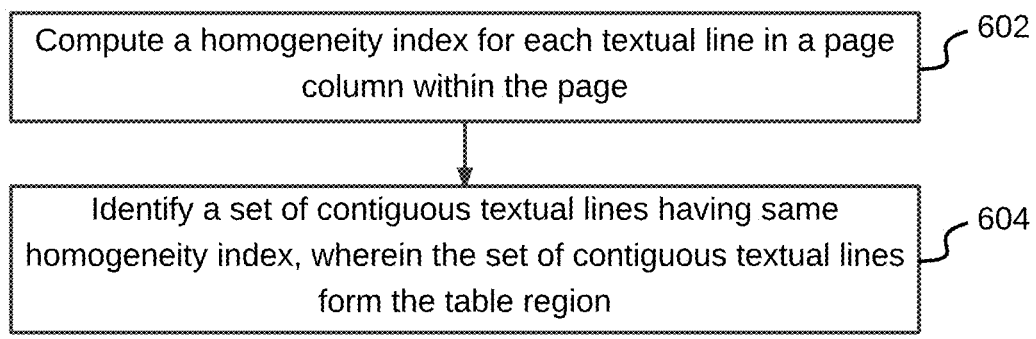
FIG. 6 illustrates a flowchart of a method for identifying a table region from a document, in accordance with an embodiment.

Referring now to FIG. 6, a flowchart of a method for identifying a table region from a document is illustrated, in accordance with an embodiment. Referring back to FIG. 3, the table region is identified by determining whether contiguous textual lines are homogenous or not. Further, in order to determine homogeneity between two or more textual lines, a homogeneity index is computed for each textual line in a page column within the page at step 602. This is repeated for each page column in every page of the document, in order to identify all table regions within the document. A homogeneity index for a textual line may computed based on a number of characters in the textual line and the plurality of preselected textual parameters. In an exemplary embodiment, homogeneity index for a textual line may be computed using equations 1 and 2 given below:

$$\text{Homogeneity Index for a textual line} = \text{Actual Homogeneity Score} / \text{Expected Homogeneity Score} \quad (1)$$

$$\text{Expected Homogeneity Score} = \{[(\text{Number of character is the textual line})2 - \text{Number of character is the textual line}] * \text{Number of preselected textual parameters}\}/2 \quad (2)$$

Figure 7:
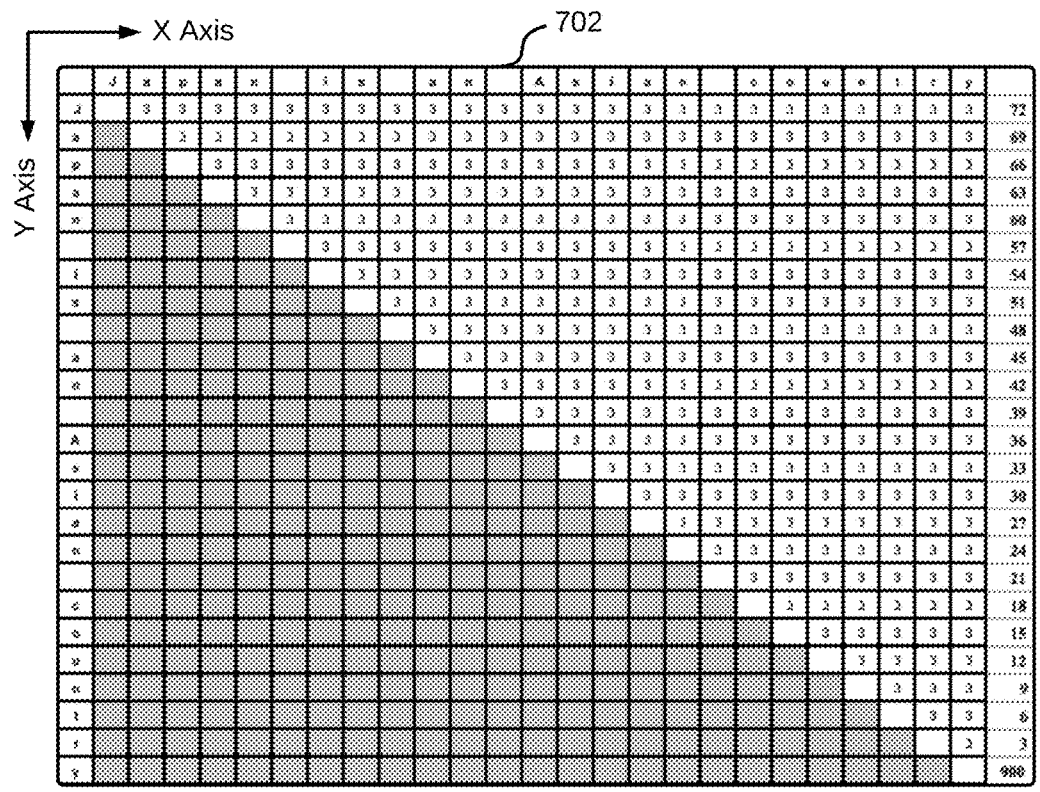
FIG. 7 illustrates score matrices used for computation of homogeneity score for two textual lines, in accordance with an exemplary embodiment.
Figure 7:
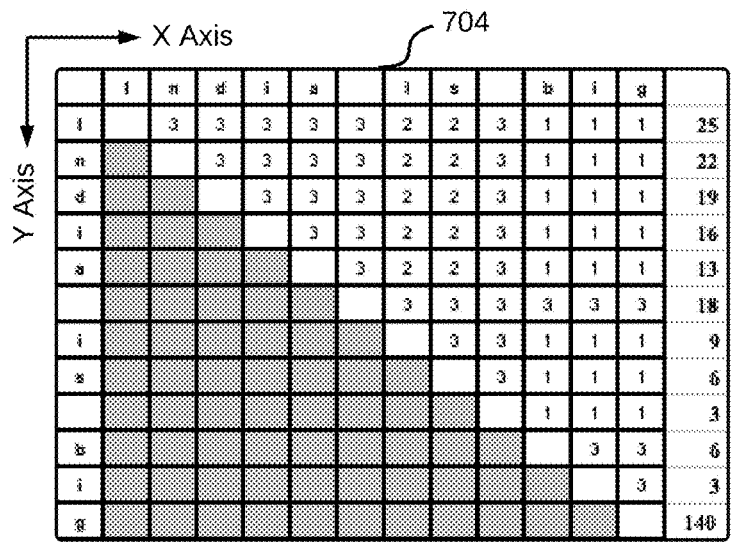

Actual Homogeneity Score is computed using a matrix explained in conjunction with exemplary embodiment of FIG. 7.

By way of an example of the exemplary embodiment given above, homogeneity indexes are computed for multiple textual lines. This is depicted in table 1 given below:

TABLE 1

| Line # | Textual Lines | No. of characters | Expected Homogeneity Score | Actual Homogeneity Score | Homogeneity Index |
|---|---|---|---|---|---|
| Line 1 | Japan is an Asian country. | 25 | 900 | 900 | 1.00 |
| Line 2 | *Delhi* is the capital of India. | 29 | 1218 | 1103 | 0.91 |
| Line 3 | India has 30 states | 19 | 513 | 479 | 0.93 |
| Line 4 | India *is* big | 12 | 198 | 140 | 0.71 |
| Line 5 | *Kolkatta* is the capital of West Bengal which is western state | 61 | 5490 | 5490 | 1.00 |
| Line 6 | YR 2013 2014 | 10 | 135 | 135 | 1.00 |
| Line 7 | Revenue 309,221 451,813 | 21 | 630 | 630 | 1.00 |
| Line 8 | Gross profit 32,652 42,770 | 23 | 759 | 759 | 1.00 |
| Line 9 | Operating Profit 3,076 14,200 | 27 | 1053 | 1053 | 1.00 |

With reference to table 1 above, there are '3' preselected textual parameters that are used to compute the homogeneity scores and index. These three preselected textual parameters include font name, font style, and font size. For illustrative purpose, expected homogeneity score for 'line 1' in table 1 is computed as given by equation 3. The three preselected textual parameters for all the characters in the 'line 1' are same.

$$\text{Expected homogeneity score for "line 1"} = [((25)2 - 25) * 3]/2 = 900 \quad (3)$$

Actual homogeneity score for "line 1" is computed using a score matrix 702 depicted in FIG. 7. In score matrix 702, each cell depicts the number of preselected textual parameter that are same for a character on the Y axis and another character on the X axis. As, for every character in the 'line 1,' all three preselected textual parameters are the same, every cell in score matrix 702 has a score of 3. When scores in every cell of each row in score matrix 702 are added, an actual homogeneity score of 900 is obtained. Thus, homogeneity index for 'line 1' is computed using equation 4 given below, as 1.0.

$$\text{Homogeneity index for line 1} = 900/900 = 1.0 \quad (4)$$

Similarly, for illustrative purpose, expected homogeneity score for 'line 4' in table 1 is computed as given by equation 5. In 'line 4,' the word 'is' is italicized, while the word 'big' is italicized and underlined:

$$\text{Expected homogeneity score for "line 4"} = [((12)2 - 12) * 3]/2 = 198 \quad (5)$$

Actual homogeneity score for 'line 4' is computed using a score matrix 704 depicted in FIG. 7. In score matrix 704, each cell depicts the number of preselected textual parameter that are same for a character on the Y axis and another character on the X axis. When scores in every cell of each row in score matrix 704 are added, an actual homogeneity score of 140 is obtained. Thus, homogeneity index for 'line 4' is computed using equation 6 given below, as 0.71:

$$\text{Homogeneity index for line 1} = 140/198 = 0.71 \quad (6)$$

Once homogeneity index has been computed for each textual line in a particular page column, a set of contiguous textual lines having same homogeneity index are identified at step 604. These set of contiguous textual lines may form the table region. In continuation of the example above and referring back to the table 1, line 5 to line 9, each have the same homogeneity index of 1.0, thus, these lines form a homogeneous region that may be a table region. In other words, lines 5 to 9 may be part of a table. In contrast, as homogeneity index for lines 1 to 4 is different for every textual line, thus, these lines do not form a homogeneous region. In other words, these lines are not part of a table region.

Figure 8:
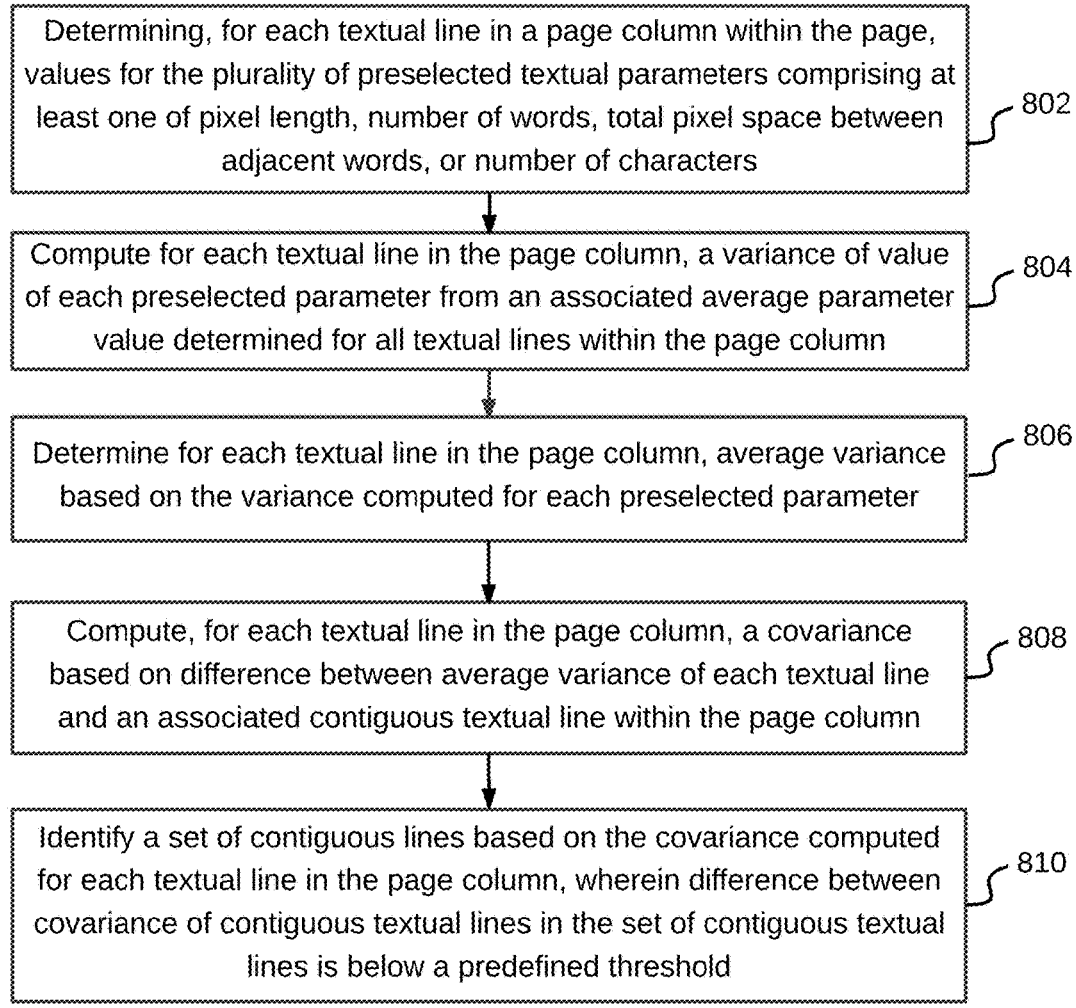
FIG. 8 illustrates a flowchart of a method for identifying a table region from a document, in accordance with another embodiment.

Referring now to FIG. 8, a flowchart of a method for identifying a table region from a document is illustrated, in accordance with another embodiment. Referring back to FIG. 3, the table region is identified by determining whether contiguous textual lines are homogenous or not. To this end, at step 802, for each textual line in a page column within the page, values for each of a plurality of preselected textual parameters is determined. The plurality of preselected textual parameters for a textual line includes at least one of, but is not limited to pixel length, number of words, total pixel space between adjacent words, or number of characters in that textual line. By way of an example, values of various preselected textual parameters for textual lines within a page column is depicted in table 2 given below. In addition to determining values for various preselected parameters, average value of these parameters across all the textual lines is also computed.

TABLE 2

| Line # | Textual Lines | Pixel Length | No. of words (X) | Pixel space between adjacent words (Y) | No. of characters (Z) |
|---|---|---|---|---|---|
| Line 1 | Japan is an Asian country. | 29 | 5 | 4 | 25 |
| Line 2 | *Delhi* is the capital of India. | 33 | 6 | 5 | 29 |
| Line 3 | India has 30 states | 22 | 4 | 3 | 19 |
| Line 4 | India *is* big | 12 | 3 | 2 | 12 |

TABLE 2-continued

| Line # | Textual Lines | Pixel Length | No. of words (X) | Pixel space between adjacent words (Y) | No. of characters (Z) |
|---|---|---|---|---|---|
| Line 5 | Kolkatta is the capital of West Bengal which is western state | 71 | 11 | 10 | 61 |
| Line 6 | YR 2013 2014 | 35 | 3 | 25 | 10 |
| Line 7 | Revenue 309,221 451,813 | 35 | 3 | 20 | 21 |
| Line 8 | Gross profit 32,652 42,770 | 35 | 3 | 20 | 23 |
| Line 9 | Operating Profit 3,076 14,200 | 35 | 3 | 20 | 27 |
| | Average Values | | 4.56 | 12.11 | 25 |

Thereafter, at step 804, for each textual line in the page column, a variance of value of one or more of the preselected textual parameter from an associated average parameter value determined for all textual lines within the page column is computed. Based on the variance computed for each preselected parameter, average variance is determined for each textual line in the page column, at step 806. In continuation of the example above and referring back to table 2, the average value of 'number of words' across lines 1 to 9 is '4.56,' the average value of 'pixel space between adjacent word' is '12.11,' and the average value of 'number of characters' is '25.' Based on these average values, variance of value of each preselected textual parameter for line 1 to line 9 is computed. Thereafter, an average value of variance for these three preselected textual parameters is also determined. This is depicted by table 3 given below:

TABLE 3

| Line # | Variance for X | Variance for Y | Variance for Z | Average Variance |
|---|---|---|---|---|
| Line 1 | 2.04 | 1.52 | 2.00 | 1.85 |
| Line 2 | 2.12 | 1.62 | 2.06 | 1.93 |
| Line 3 | 1.94 | 1.39 | 1.88 | 1.74 |
| Line 4 | 1.82 | 1.22 | 1.60 | 1.55 |
| Line 5 | 2.38 | 1.92 | 2.39 | 2.23 |
| Line 6 | 1.82 | 2.31 | 1.60 | 1.91 |
| Line 7 | 1.82 | 2.22 | 1.92 | 1.99 |
| Line 8 | 1.82 | 2.22 | 1.96 | 2.00 |
| Line 9 | 1.82 | 2.22 | 2.03 | 2.02 |

Referring to table 2 and 3, log values are considered to compute the variance for X, Y, and Z, as there is logarithmic difference between the preselected textual parameters and their average values across all textual lines in a page column. The variance for X, Y, and Z for a given textual line may be computed using equations 7, 8, and 9 given below.

$$\text{Variance for } X = \text{Log}(X*100/\text{Average value for } X) \quad (7)$$

$$\text{Variance for } Y = \text{Log}(Y*100/\text{Average value for } Y) \quad (8)$$

$$\text{Variance for } Z = \text{Log}(Z*100/\text{Average value for } Z) \quad (9)$$

We consider 'line 1: Japan is an Asian country,' to illustrate computation of variance for X, Y, and Z and computation of average variance for 'line 1'. These computations are depicted using equations 10, 11, 12 and 13 give below:

$$\text{Variance for } X \text{ for line } 1 = \text{Log}(5*100/4.56) = 2.04 \quad (10)$$

$$\text{Variance for } Y \text{ for line } 1 = \text{Log}(4*100/12.11) = 1.52 \quad (11)$$

$$\text{Variance for } Z \text{ for line } 1 = \text{Log}(25*100/25) = 2 \quad (12)$$

$$\text{Average variance for line } 1 = (2.04+1.52+2)/2 = 1.85 \quad (13)$$

Based on difference between average variance of each textual line and an associated contiguous textual line within the page column, a covariance is computed for each textual line in the page column at step 808. In continuation of the example above and referring back to table 3, covariance for each of line 1 to 9 is computed. This is depicted in table 4 given below:

TABLE 4

| Line # | Average Variance | Covariance |
|---|---|---|
| Line 1 | 1.85 | 0.08 (1.93 − 1.85) |
| Line 2 | 1.93 | 0.19 (1.74 − 1.93) |
| Line 3 | 1.74 | 0.19 (1.55 − 1.74) |
| Line 4 | 1.55 | 0.68 (2.23 − 1.55) |
| Line 5 | 2.23 | 0.32 (1.91 − 2.23) |
| Line 6 | 1.91 | 0.08 (1.99 − 1.91) |
| Line 7 | 1.99 | 0.01 (2.00 − 1.99) |
| Line 8 | 2.00 | 0.02 (2.02 − 2.00) |
| Line 9 | 2.02 | |

Based on the covariance computed for each textual line in the page column, a set of contiguous lines are identified at step 810. The set of contiguous lines is selected such that the difference between covariance of contiguous textual lines in the set of contiguous lines is below a predefined threshold. These set of contiguous lines are then considered homogeneous and may form the table region. In an embodiment, the difference between the covariance of contiguous textual lines in the set of contiguous lines may either be constant or close. In continuation of the example above and referring back to table 4, covariance for each of line 6 to 9 is below 0.1, thus these contiguous lines for a homogeneous region that may be a table region. Once a homogenous region has been identified, coordinates for this homogeneous region are stored (for example, X and Y coordinates for top left and bottom right of the table region). Steps 802 to 810 are then repeated for every page column across the plurality of pages in the document to identify more table regions. The homogenous region may or may not be a table region. This is determined using the method described on detail in conjunction with FIG. 9.

Figure 9:
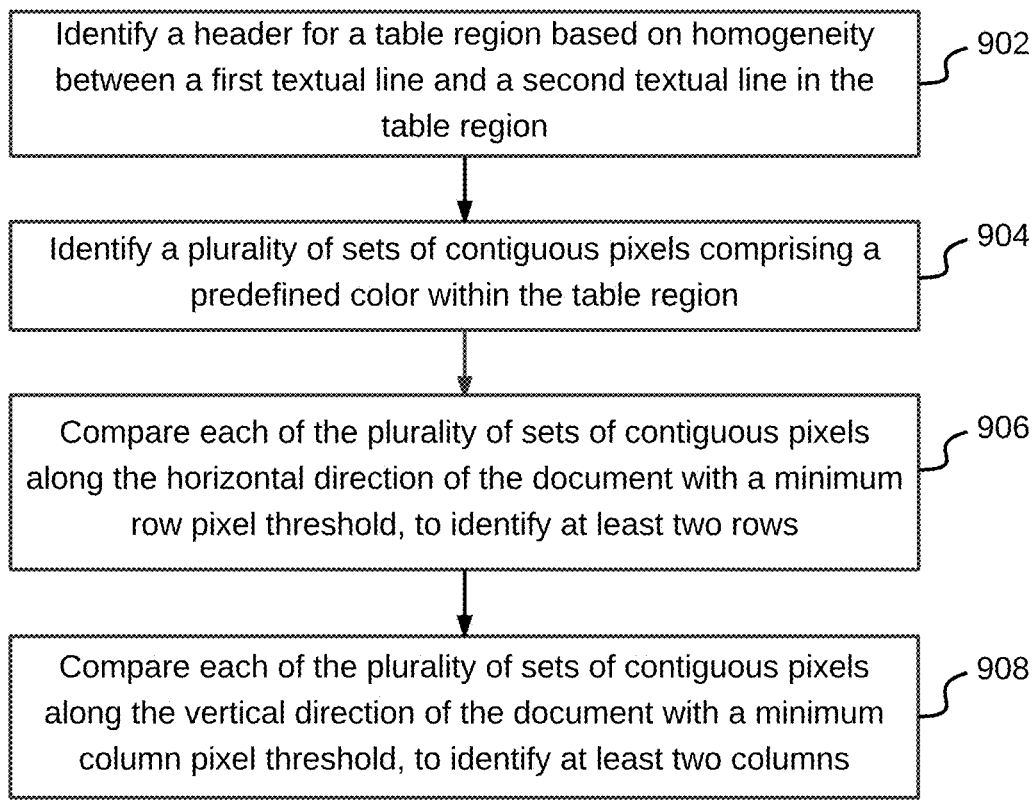
FIG. 9 illustrates a flowchart of a method for identifying rows and columns within a table region, in accordance with an embodiment.

Referring now to FIG. 9, a flowchart of a method for identifying rows and columns within a homogeneous region is illustrated, in accordance with an embodiment. The homogeneous region is a table region only when it includes at least two rows and at least two columns. In absence of the minimum number of rows and columns, the homogeneous region is not considered as a table region for further analysis.

In order to identify rows and columns, the stored coordinates or boundary of the homogeneous region or the table region is used. At step 902, a header row for the table region is identified based on homogeneity between a first textual line and a second textual line within the boundary of the table region. Homogeneity between the first and the second textual line may be determined using either of method described in FIG. 6 or FIG. 8 or a combination thereof. If homogeneity variance between other contiguous textual lines within the table region, when compared to homogeneity variance (or covariance) between the first and the second textual line is high, then the first textual line is identified as the header row. Alternatively, if the homogeneity variance between the first textual line and the second textual line is less than a predefined threshold, textual line immediately above the table boundary, within the same page column and page as the table region, is identified as the header row. However, in absence of such a textual line, the first textual line within the boundary of the table region is identified as the header row.

Figure 10:
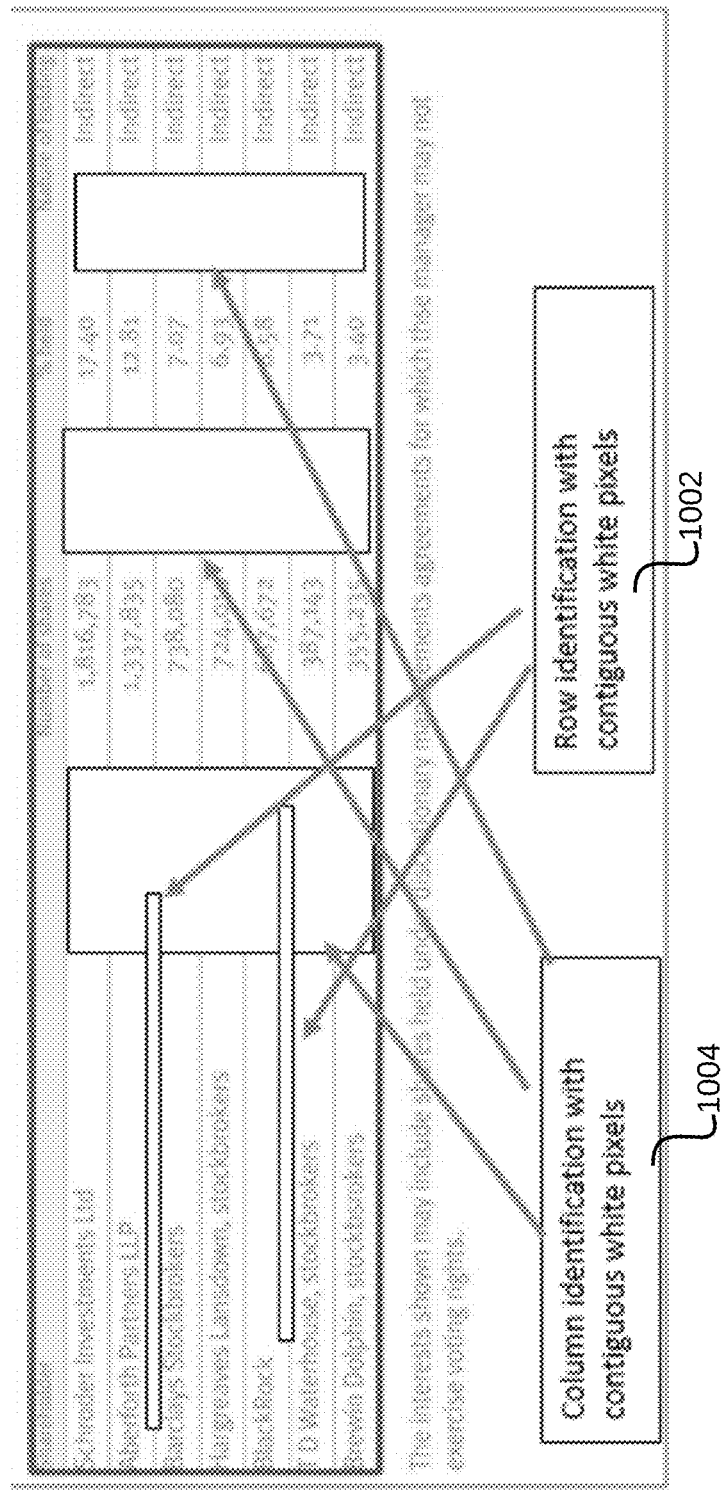
FIG. 10 illustrates identification of rows and columns within a table region, in accordance with an exemplary embodiment.

Thereafter, at step 904, a plurality of sets of contiguous pixels comprising a predefined color within the table region are identified. The plurality of sets of contiguous pixels are identified in both vertical and horizontal direction within the table region. The predefined color, for example, may be white. This is illustrated in the exemplary embodiment of FIG. 10, where multiple sets of contiguous white pixels are identified in both horizontal and vertical direction within the boundary of the table region.

Once the plurality of sets of contiguous pixels have been identified, to identify two or more rows, each of the plurality of sets of contiguous pixels along the horizontal direction of the document is compared with a minimum row pixel threshold, at step 906. The minimum row pixel threshold may define a minimum width for a set of contiguous pixel along the vertical direction and a minimum length for a set of contiguous pixel along the horizontal direction. A set of contiguous pixels that meets the minimum row pixel threshold, identifies one row above and one row below the set of contiguous pixels. By way of an example, a box 1002 in FIG. 10 identifies two sets of contiguous white pixels in the horizontal direction. Each set of contiguous white pixels separates two rows.

Similarly, to identify two or more columns, each of the plurality of sets of contiguous pixels along the vertical direction of the document is compared with a minimum column pixel threshold. The minimum column pixel threshold may define a minimum width for a set of contiguous pixel along the horizontal direction and a minimum length for a set of contiguous pixel along the vertical direction. A set of contiguous pixels that meets the minimum column pixel threshold, identifies one column on the left and one column on the right of the set of contiguous pixels. By way of an example, a box 1004 in FIG. 10 identifies three sets of contiguous white pixels in the vertical direction. Each set of contiguous white pixels separates two columns, thus, four columns are identified in FIG. 10.

Figure 11:
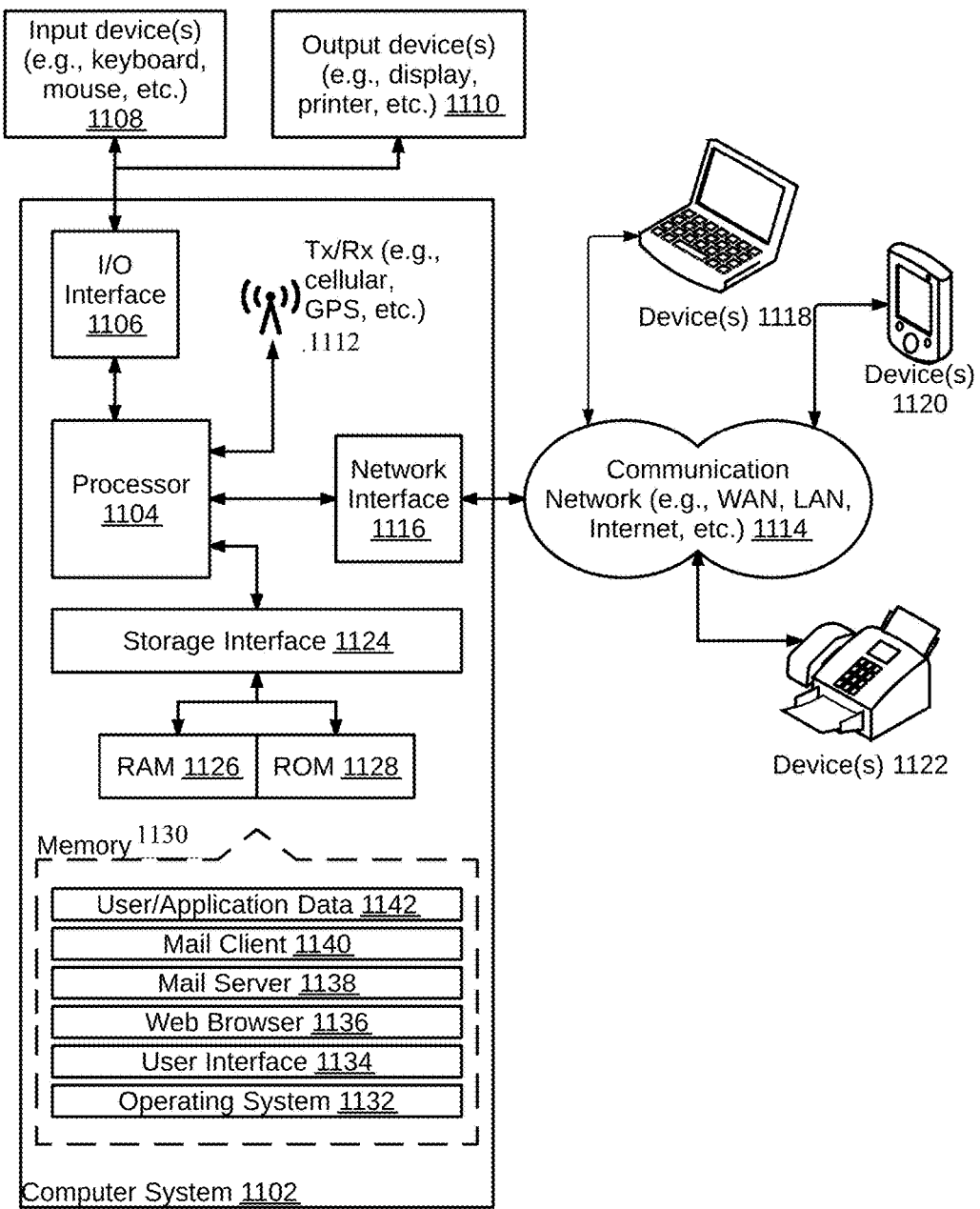
FIG. 11 illustrates a block diagram of an exemplary computer system for implementing various embodiments.

FIG. 11 is a block diagram of an exemplary computer system for implementing various embodiments. Computer system 1102 may include a central processing unit ("CPU" or "processor") 1104. Processor 1104 may include at least one data processor for executing program components for executing user- or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1110 may be a printer, fax machine, video display (e.g., cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (e.g., using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (e.g., RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (e.g., any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide methods and devices for extracting text from documents. The method enables detecting tabular text structures, such as, page columns and tables within a document based on homogeneity between textual lines in the document. Moreover, rows, columns, and cells within a table are also detected based on homogeneity between textual lines. As detection is made up to the basic unit of a table, i.e., a cell, data represented in the form of table can be accurately extracted and stored in any desired format. The method thus overcomes the challenge to accurately identify and retrieve information from a table, owing to large variability of table layouts, table styles, information type and format and lack of availability of document encoding/formats information.

The specification has described methods and devices for extracting text from documents. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for extracting text from a document, the method comprising:
    performing, by a text extraction device, a layout analysis on the document to identify a plurality of regions within a plurality of pages in the document;
    identifying, by the text extraction device, a table region from within the plurality of regions based on homogeneity between a plurality of textual lines in a page from the plurality of pages, wherein the homogeneity is computed based on a plurality of preselected textual parameters associated with the plurality of textual lines, wherein identifying the table region further comprises:
        determining, for each textual line in a page column within the page, values for the plurality of preselected textual parameters comprising at least one of pixel length, number of words, total pixel space between adjacent words, or number of characters;
        computing, for each textual line in the page column, a variance of value of at least one of the plurality of preselected textual parameter from an associated average parameter value determined for all textual lines within the page column;
        determining, for each textual line in the page column, an average variance based on the variance computed for each of the at least one of the plurality of preselected textual parameters; and
        computing, for each textual line in the page column, a covariance based on a difference between the average variance of each textual line and an associated contiguous textual line within the page column;
    identifying, by the text extraction device, at least two rows and at least two columns within the table region;
    identifying, by the text extraction device, a plurality of cells within the table region based on the at least two rows and the at least two columns; and
    extracting, by the text extraction device, text from each of the plurality of cells.

2. The method of claim 1, wherein the plurality of regions comprises at least one of at least one header, at least one footer, at least one page column, or at least one image.

3. The method of claim 2, wherein at least one page column is identified based on a threshold number of characters and a threshold number of words associated with a page column width.

4. The method of claim 1, wherein identifying the table region further comprises:
    computing a homogeneity index for each textual line in a page column within the page, wherein a homogeneity index for a textual line is computed based on a number of characters in the textual line and the plurality of preselected textual parameters; and
    identifying a set of contiguous textual lines having a same homogeneity index, wherein the set of contiguous textual lines form the table region.

5. The method of claim 1, wherein identifying the at least two rows and the at least two columns within the table region further comprises:
    identifying a plurality of sets of contiguous pixels comprising a predefined color within the table region;
    comparing each of the plurality of sets of contiguous pixels along the horizontal direction of the document with a minimum row pixel threshold, to identify the at least two rows; and
    comparing each of the plurality of sets of contiguous pixels along the vertical direction of the document with a minimum column pixel threshold, to identify the at least two columns.

6. A text extraction device for extracting text from a document, the text extraction device comprises:
    a processor; and
    a memory communicatively coupled to the processor, wherein the memory stores instructions, which, on execution by the processor, causes the processor to:
        perform a layout analysis on the document to identify a plurality of regions within a plurality of pages in the document;
        identify a table region from within the plurality of regions based on homogeneity between a plurality of textual lines in a page from the plurality of pages, wherein the homogeneity is computed based on a plurality of preselected textual parameters associated with the plurality of textual lines, wherein identifying the table region further comprises:
            determine for each textual line in a page column within the page, values for the plurality of preselected textual parameters comprising at least one of pixel length, number of words, total pixel space between adjacent words, or number of characters;
            compute, for each textual line in the page column, a variance of value of at least one of the plurality of preselected textual parameter from an associated average parameter value determined for all textual lines within the page column;
            determine, for each textual line in the page column, an average variance based on the variance computed for each of the at least one of the plurality of preselected textual parameters; and
            compute, for each textual line in the page column, a covariance based on a difference between the average variance of each textual line and an associated contiguous textual line within the page column;
identify at least two rows and at least two columns within the table region;
identify a plurality of cells within the table region based on the at least two rows and the at least two columns; and
extract text from each of the plurality of cells.

7. The text extraction device of claim 6, wherein the plurality of regions comprises at least one of at least one header, at least one footer, at least one page column, or at least one image.

8. The text extraction device of claim 7, wherein at least one page column is identified based on a threshold number of characters and a threshold number of words associated with a page column width.

9. The text extraction device of claim 6, wherein the instructions, on execution by the processor, further cause the processor to:
compute a homogeneity index for each textual line in a page column within the page, wherein a homogeneity index for a textual line is computed based on a number of characters in the textual line and the plurality of preselected textual parameters; and
identify a set of contiguous textual lines having a same homogeneity index, wherein the set of contiguous textual lines form the table region.

10. The text extraction device of claim 6, wherein the instructions, on execution by the processor, further cause the processor to:
identify a plurality of sets of contiguous pixels comprising a predefined color within the table region;
compare each of the plurality of sets of contiguous pixels along the horizontal direction of the document with a minimum row pixel threshold, to identify the at least two rows; and
compare each of the plurality of sets of contiguous pixels along the vertical direction of the document with a minimum column pixel threshold, to identify the at least two columns.

11. A non-transitory computer-readable storage medium comprising a set of executable instructions stored thereon that, when executed by one or more processors, cause the processors to:
perform a layout analysis on the document to identify a plurality of regions within a plurality of pages in the document;
identify a table region from within the plurality of regions based on homogeneity between a plurality of textual lines in a page from the plurality of pages, wherein the homogeneity is computed based on a plurality of preselected textual parameters associated with the plurality of textual lines, wherein identifying the table region further comprises:
determine for each textual line in a page column within the page, values for the plurality of preselected textual parameters comprising at least one of pixel length, number of words, total pixel space between adjacent words, or number of characters;
compute, for each textual line in the page column, a variance of value of at least one of the plurality of preselected textual parameter from an associated average parameter value determined for all textual lines within the page column;
determine, for each textual line in the page column, an average variance based on the variance computed for each of the at least one of the plurality of preselected textual parameters; and
compute, for each textual line in the page column, a covariance based on a difference between the average variance of each textual line and an associated contiguous textual line within the page column;
identify at least two rows and at least two columns within the table region;
identify a plurality of cells within the table region based on the at least two rows and the at least two columns; and
extract text from each of the plurality of cells.

12. The non-transitory computer-readable storage medium of claim 11, wherein the plurality of regions comprises at least one of at least one header, at least one footer, at least one page column, or at least one image.

13. The non-transitory computer-readable storage medium of claim 12, wherein at least one page column is identified based on a threshold number of characters and a threshold number of words associated with a page column width.

14. The non-transitory computer-readable storage medium of claim 11, wherein the instructions, when executed by the processors, further causes the processor to:
compute a homogeneity index for each textual line in a page column within the page, wherein a homogeneity index for a textual line is computed based on a number of characters in the textual line and the plurality of preselected textual parameters; and
identify a set of contiguous textual lines having a same homogeneity index, wherein the set of contiguous textual lines form the table region.

15. The non-transitory computer-readable storage medium of claim 11, wherein the instructions, when executed by the processors, further causes the processor to:
identify a plurality of sets of contiguous pixels comprising a predefined color within the table region;
compare each of the plurality of sets of contiguous pixels along the horizontal direction of the document with a minimum row pixel threshold, to identify the at least two rows; and
compare each of the plurality of sets of contiguous pixels along the vertical direction of the document with a minimum column pixel threshold, to identify the at least two columns.

* * * * *